3,106,535
NEUTRON RADIATION SHIELDING MATERIAL
Angel Alberto Blanco, Birmingham, England, assignor to Imperial Chemical Industries Limited, London, England, a corporation of Great Britain
No Drawing. Filed Dec. 28, 1959, Ser. No. 862,071
Claims priority, application Great Britain Aug. 24, 1959
1 Claim. (Cl. 252—478)

This invention relates to neutron radiation shielding material. In particular the invention is concerned with neutron retarding materials used to form neutron attenuating and absorbing materials and shields made from these latter materials. These attenuating and absorbing materials and shieldings made therefrom are of particular use in the shielding of nuclear reactors on board sea-going vessels and in aircraft.

According to the present invention there is provided a composition of matter having neutron radiation shielding properties comprising a neutron retarding material in the form of discrete particles disposed in a matrix of material containing at least 3% by weight of hydrogen.

According to one form of the invention, the composition of matter is a composite material having neutron-attenuating properties comprising discrete chips of a solid material containing at least 3% of hydrogen by weight, the chips being disposed in a matrix of material containing at least 3% by weight of hydrogen. The chips may, for example, be polythene, cured polyester or epoxy resins, nylon or polyethylene terephthalate. For many applications, the preferred shapes of the chips are those which provide the greatest voidage, e.g. short lengths of rod-like or tubular chips or small helices. For other applications, however, low voidage is desirable and spheroidal chips, for example, are preferably used. In this said form of the invention the matrix may consist of certain mineral oils, water, silicone fluids, ethylene glycol, polyester, polystyrene or epoxy type resins. Preferably the density of the matrix material is not less than half or more than twice the density of the solid material.

For convenience in forming the attenuating shield material in position on site it is necessary that the matrix is or can be rendered sufficiently flexible, plastic or fluid so as to enable it to be poured in position to fill the interstices between the discrete particles of neutron retarding material. It is not necessary, however, that the matrix should retain its fluidity at the working temperature.

According to another form of this invention a composition of matter suitable for forming a neutron-absorbing radiation shield comprises particles of boron carbide or other boron or cadmium neutron-absorbing compound embedded in a solid matrix material containing at least 3% by weight of hydrogen.

Preferably the solid matrix material is polyethylene or polystyrene or a cured resin such as a polyester or epoxide resin, it being essential that the solid material is one which can be brought, or has at some initial stage in its fabrication been brought, into a condition of sufficient fluidity as to enable the particles of boron or cadmium compound to be dispersed therethrough. The choice of a particular material in which to embed the boron or cadmium compound will, in practice, depend upon the temperature at which the radiation shield prepared from such material is designed to operate; but where the density of the neutron-absorbing compound differs substantially from that of the solid material it is desirable that the solid material remains solid at the temperature assumed by the shield under working conditions so keeping the absorbing material uniformly dispersed.

If boron carbide is used as the neutron-absorbing material, in one example, a three-component system comprises 1% by weight of boron carbide, 20% by weight of a polyester-type or epoxy-type resin and 79% by weight of granular polythene. The boron carbide may be added to either the polythene or the resin or to both prior to the final mixing and curing or setting of the resin.

The solid matrix containing the dispersed particles of boron or cadmium neutron absorbing compound may itself be used in the form of chips disposed in a second matrix of a material containing at least 3% by weight of hydrogen. An example of such a neutron absorbing composition conveniently comprises a hydro-carbon oil and chips of polythene containing 2% by weight of boric oxide.

Neutron-absorbing and attenuating radiation shields made from materials in accordance with the invention can be reinforced by means of loose fibres or woven material such as material made from glass fibres or material made from nylon, polyethylene terephthalate or cellulose fibres included in the matrix. The shielding material may also have fillers and reinforcing additions such as carbon in powder form, wood dust or aluminium powder or combinations thereof included in the matrix. The shield can be readily fabricated into desired shape by means of casting or other well-known techniques for handling and forming plastic materials. Furthermore, neutron-absorbent materials in accordance with this invention can be applied to a reactor casing or fuel element container of a fuel charging machine, in the fluid or plastic state and cured or otherwise caused to solidify in situ. If desired, a thixotropic filler, preferably polyvinyl chloride or finely divided silica, can be added to the mix when it is necessary to prevent flow on inclined or vertical surfaces prior to curing.

To improve the heat transfer properties of the radiation shield, a proportion of a suitable metallic powder, such as aluminium powder, may be dispersed throughout the solid matrix. Also, material capable of absorbing gamma radiation, e.g. lead or lead compounds, may be incorporated in the solid matrix.

Furthermore, if desired, neutron-absorbing material in accordance with the invention when in sheet form may be clad on one or both sides with aluminium or with a plastic material such as polyester-type or phenolic-type resin reinforced by asbestos fibres or glass fibres preferably having a low alkali content.

When neutron-absorbing material in accordance with the invention is clad on both sides with aluminium, the exposed edges of the material may be covered by fitting a channel of aluminium over the exposed edges and welding the sides of the channel to the cladding sheets or may be covered by butt welding a strip of aluminium to the exposed edges of the cladding sheets.

When neutron-absorbing material in accordance with the invention is clad on both sides with a reinforced plastics material the exposed edges of the neutron-absorbing material may be covered by a similar reinforced plastics material suitably secured to the cladding sheets.

As stated above one very convenient form of neutron-absorbing radiation shield makes use of a composition in the form of discrete chips of a solid matrix in which the neutron-absorbing material is embedded, the said chips being themselves disposed in a second matrix of a material containing at least 3% by weight of hydrogen. As materials for the second matrix there may be used certain mineral oils, water or silicone fluids, the material of the second matrix preferably being less dense than the chips containing the neutron-absorbing material. For convenience in forming the shield in position on the site it is preferable that the material forming the second matrix can be rendered sufficiently flexible, plastic or fluid so as to enable it to be poured in position around the chips, although it is not necessary that such matrix material retains its fluidity at the working temperature. For use at relatively low temperatures, that is below the melting point of polythene, a material mentioned above consisting of a hydrocarbon oil and polythene chips containing 2% by weight of boric oxide may be used. Conveniently the chips can be loaded between liquid-impervious retaining walls surrounding the object to be shielded and the hydrocarbon oil added to fill the spaces between the chips. In general, for temperatures up to 120° C. the second matrix material may be of paraffin wax, bitumen or natural or artificial rubber. For use at higher temperatures, e.g. 100 to 250° C., the chips are preferably composed of an epoxy-type resin in which the neutron-absorbing material is dispersed and the second matrix material consists of a silicone fluid for example a methyl silicone fluid which has considerable flexibility when gelled.

Particularly satisfactory materials having neutron-attenuating properties are set out in the following examples:

(i) For use at low temperatures, e.g. 100° C., polythene in the form of small spheres (⅛ inch average diameter) is disposed in a mineral oil such as gas oil or a polyester or polystyrene resin.

(ii) For use at higher temperatures, e.g. 200° C., chips of nylon or polyethylene terephthalate are dispersed in a silicone fluid.

As stated earlier these solid chips may contain additions of boron or cadmium or an oxide or carbonate thereof in order that the material can effectively absorb neutrons. Furthermore, they may contain additions of heavy elements such as lead, barium or iron or their compounds in order to provide effective absorption of gamma radiation. Alternatively, the neutron-absorbing materials or the gamma-absorbing materials may be disposed on the periphery of the neutron-attenuating material remote from the source of radiation, e.g. as separate layers. Thus, for example, the casing in which the neutron-attenuating material is contained may be a boron-containing steel which is itself then clad with a heavy metal such as lead to absorb the gamma radiation.

I claim:

A radiation shield having a composition of matter comprising discrete chips of nylon dispersed in a fluid selected from the group consisting of mineral oil, water, silicone fluid and ethylene glycol and an external cladding of aluminum sheet.

References Cited in the file of this patent

UNITED STATES PATENTS

| | | |
|---|---|---|
| 2,796,411 | Zirkle et al. | June 18, 1957 |
| 2,796,529 | Morrison | June 18, 1957 |
| 2,811,487 | Stanton | Oct. 29, 1957 |
| 2,853,624 | Wigner et al. | Sept. 23, 1958 |
| 2,853,451 | Silversher | Oct. 28, 1958 |
| 2,928,948 | Silversher | Mar. 15, 1960 |
| 2,961,415 | Axelrad | Nov. 22, 1960 |

FOREIGN PATENTS

| | | |
|---|---|---|
| 686,445 | Great Britain | Jan. 28, 1953 |

OTHER REFERENCES

AECU–1952, Elastomeric Materials as Shielding Compounds for Nuclear Reactors, 1952, page 10. Copy in Div. 46.